United States Patent [19]

Calvignac et al.

[11] Patent Number: 4,799,219
[45] Date of Patent: Jan. 17, 1989

[54] PSEUDO SYNCHRONOUS TRANSPORT MECHANISM IN A COMMUNICATION NETWORK

[75] Inventors: Jean Calvignac, LaGaude; Pierre Secondo, St Jeannet, both of France

[73] Assignee: International Business Machines Corp., Armonk, N.Y.

[21] Appl. No.: 77,484

[22] Filed: Jul. 24, 1987

[30] Foreign Application Priority Data

Aug. 27, 1986 [EP] European Pat. Off. ......... 86430029.8

[51] Int. Cl.$^4$ .............................................. H04J 3/26
[52] U.S. Cl. ..................................................... 370/94
[58] Field of Search .......................... 370/60, 85, 89, 94

[56] References Cited

U.S. PATENT DOCUMENTS

| 4,603,416 | 7/1986 | Servel et al. | 370/60 |
| 4,623,996 | 11/1986 | McMillen | 370/60 |
| 4,718,062 | 1/1988 | Andersen | 370/94 |

FOREIGN PATENT DOCUMENTS

| 0059149 | 2/1981 | European Pat. Off. |
| 0122765 | 4/1983 | European Pat. Off. |
| 2006574 | 10/1977 | United Kingdom |

OTHER PUBLICATIONS

A Hybrid Switched Open Network for Voice and Data Services, by C. Fruchard et al., Proceedings of the International Switching Symposium, 7-11, May 1984, Florence, Italy, pp. 2.1,2.7,3.1.2.

Primary Examiner—Douglas W. Olms
Attorney, Agent, or Firm—Edward H. Duffield

[57] ABSTRACT

A pseudo synchronous mechanism is used in the nodes of a communication network for exchanging non-character coded information (NCI) and potentially character coded information on inter node links. Communication is performed in frames comprising circuit slots devoted to the transportation of character coded information. The circuit slots are assigned to circuit users on a per-call basis under control of node management apparatus. The slots are qualified by at least one qualification bit (Caq) which indicates, when set to a first value (0) that the users are momentarily active and when set to a second value (1) that the users are momentarily inactive. The node mechanism includes a store in which queues of storing positions are assigned to the circuit users attached to the node. The circuit user information to be sent on the network internode links or received from the internode links is stored in the store. The node mechanism further includes an internode adapter which controls the generation and reception of the frames to and from each internode link. The adapter operates under control of a node manager which assigns on a per-call basis, a set of at least one slot in the frames transported on the network link to each of a plurality of circuit users. The node also includes transmit and receive controls which cause the queues assigned to the plurality of local users to be sequentially scanned and read from or written to according to whether the qualification bits are set to a first value.

8 Claims, 11 Drawing Sheets

FIG. 2A
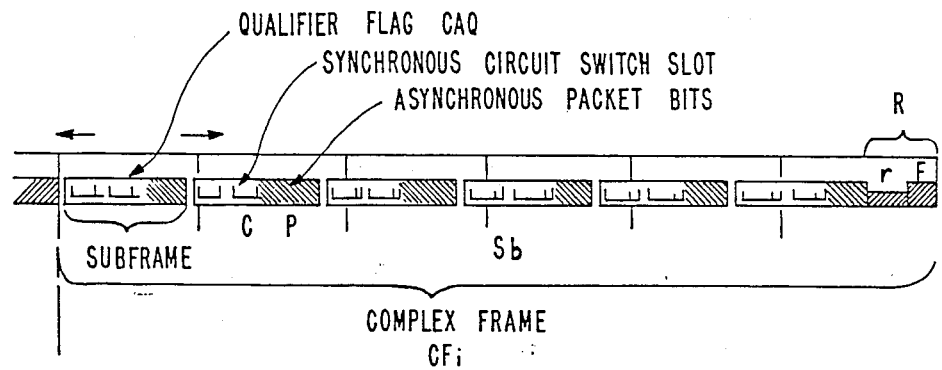
FIG. 2B
FIG. 2C
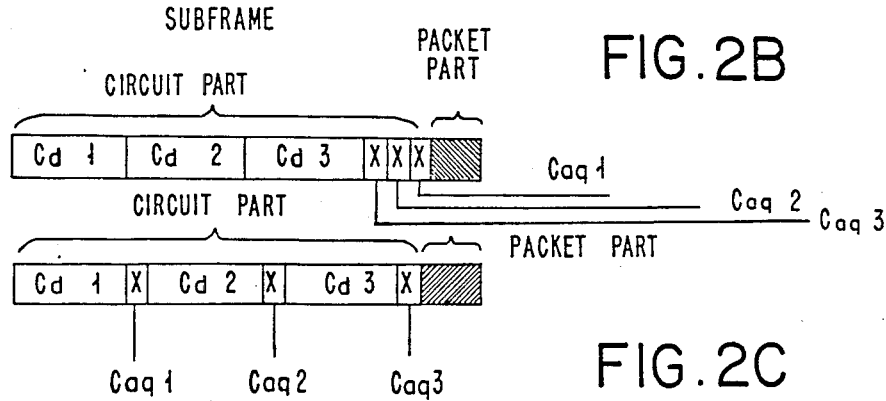

| FIG. 3A | FIG. 3B |

PSEUDO SYNCHRONOUS TRANSPORT MECHANISM IN A COMMUNICATION NETWORK

DESCRIPTION OF THE INVENTION

1. Technical Field

This invention relates to a mechanism to be used in a packet/circuit switched communication system for dynamically re-allocating the bandwidth left on a circuit switched connection for the short period of time where the the circuit source is not actively transmitting.

2. Background Art

Future communication networks will have to accommodate "packet switched" as well as "circuit switched" traffic. Different ways for realizing this merger are known. However, in the long range, only the most economical methods will survive. The best methods are the ones that continuously optimize the utilization of the telecommunication network resources. Optimization is provided in the function of the actual transmission service requested by the network user.

A method that allows adaptive sharing of the network nodes as well as the inter-node links is described in co-pending, commonly assigned U.S. patent application Ser. No. 893,073 filed on Aug. 4, 1986 and entitled "Adaptive packet/circuit switched transportation method and system".

A mechanism that allows reallocation dynamic on a "per call" basis, of the bandwidth on an inter-node link is described in co-pending, commonly assigned U.S. patent application Ser. No. 892,649 filed on Aug. 4, 1986 and entitled "Dynamic bandwidth allocation mechanism between circuit slots and packet bit stream in a communication network".

A mechanism that allows re-allocation dynamic, on "per slot" basis, of the bandwith on an inter-node link is disclosed in co-pending, commonly assigned patent application Ser. No. 077,485 filed on the same day as the present application and entitled "Optimized bandwidth allocation mechanism between circuit slots and packet bit stream in a communication network".

When used together in a telecommunication network, the above methods and mechanisms allow provision of very efficient packet switched and circuit switched services. At each instant, the total available bandwidth is re-arranged to give the best possible throughput according to the actual traffic profile.

However, when all the sharable link bandwidth has been re-allocated to circuit slots using these methods and mechanisms, any new circuit switched call is to be rejected.

Such a situation will happen in the networks whenever the packet traffic is small as compared with the circuit traffic. In this case, the "buffer bandwidth" provided to the circuit traffic by the packet traffic is very slim.

Such a problem cannot be eliminated without jitter if a true circuit switched transmission system is desired or if the circuit sources are actively transmitting data during all the connection time (100% full duplex activity).

But many applications are "bursty" and/or half duplex and would accept a limited jitter of perhaps a few milliseconds. In any case, if a "zero jitter" appearance is required it is easy to re-create it by simple queueing in front of the receiver as long as the jitter introduced by the transmission system is limited.

Typical applications are:

1 - Voice applications, where the channel is used less than 45% of the time, and where packetization techniques have been used despite of their inherent drawbacks (IE: delays, jitter) for the only purpose of improving the network link bandwidth utilization.

2 - Circuit switched data applications, which imply interactive terminals working in circuit switched mode, i.e.: X.21 terminals where the line occupation rate is even lower than 45% of the time and where it has been necessary to implement complex CALL/CLEAR operating procedures (SHORT HOLD mode operation) to improve the operational cost of the system.

OBJECT OF THE INVENTION

An object of the present invention is to provide an improved "Pseudo-synchronous" transmission mode of operation in which "Circuit Slots" defined in frames (which may have the configuration described in FIGS. 2A-2C and in the above referenced patent applications) can dynamically be shared among several circuit users operating in this pseudo-synchronous transmission mode. It allows further optimization of the link utilization, when the link is mainly loaded with circuit traffic.

SUMMARY OF THE INVENTION

The present invention relates to a mechanism to be used for providing the above defined "pseudo synchronous" transmission service. It is used in conjunction with the above mentioned mechanisms, in an integrated packet/circuit switched telecommunication network, The pseudo synchronous transportation mechanism is to be used in a communication network comprising a plurality of nodes for exchanging non character coded information (NCI) and potentially character coded information on network links, Communication on the links is performed in frames comprising circuit slots devoted to the transportation of character coded information which are assigned to circuit users on the a per-call basis under control of node management means 13. The slots are qualified by at least one qualification bit (Caq) which indicates when set to a first value (0) that the users are momentarily active and when set to a second value (1) that the users are momentarily inactive.

The mechanism in the nodes comprises:

A storing means (11, 12) in which queues of storing positions are assigned to circuit users which send and receive information in the slots of the frames transported on the links connected to the node. Circuit user information received from the node links (L1, L2) is stored in the assigned queues.

The mechanism at each node further includes inter-node adapting means (14,15) which control the generation and the reception of the frames to and from each internode link. These internode adapters operate under control of node management means which assigns on a per-call basis, a set of at least one slot in the frames transported on the link to a plurality of circuit users. The node management and adapter comprises, for each of said links, transmit and receive control means (24-T, 26-T, 20-R, 22-R, 28).

The transmit control means causes the queues assigned to the plurality of circuit users to be sequentially scanned and read, with the read information corresponding to momentarily active users to be sent on the link during the assigned slot(s) of successive frames together with a qualification bit set to a first value.

When the qualification bits are found equal to the first value, the receive control means causes the information received in the slot(s) assigned to the said plurality of users in successive frames to be written into the queues assigned to said users, which are sequentially scanned.

BRIEF DESCRIPTION OF THE FIGURES

FIGS. 2A-2C illustrate the configuration of the frames which are used in a preferred embodiment of the invention.

FIGS. 5-A and 5-B illustrate the transmit part of the frame handling means 28.

FIG. 6-A and FIG. 6-B represents the receive part of the frame handling means 28.

DETAILED SPECIFICATION

Figure 1:
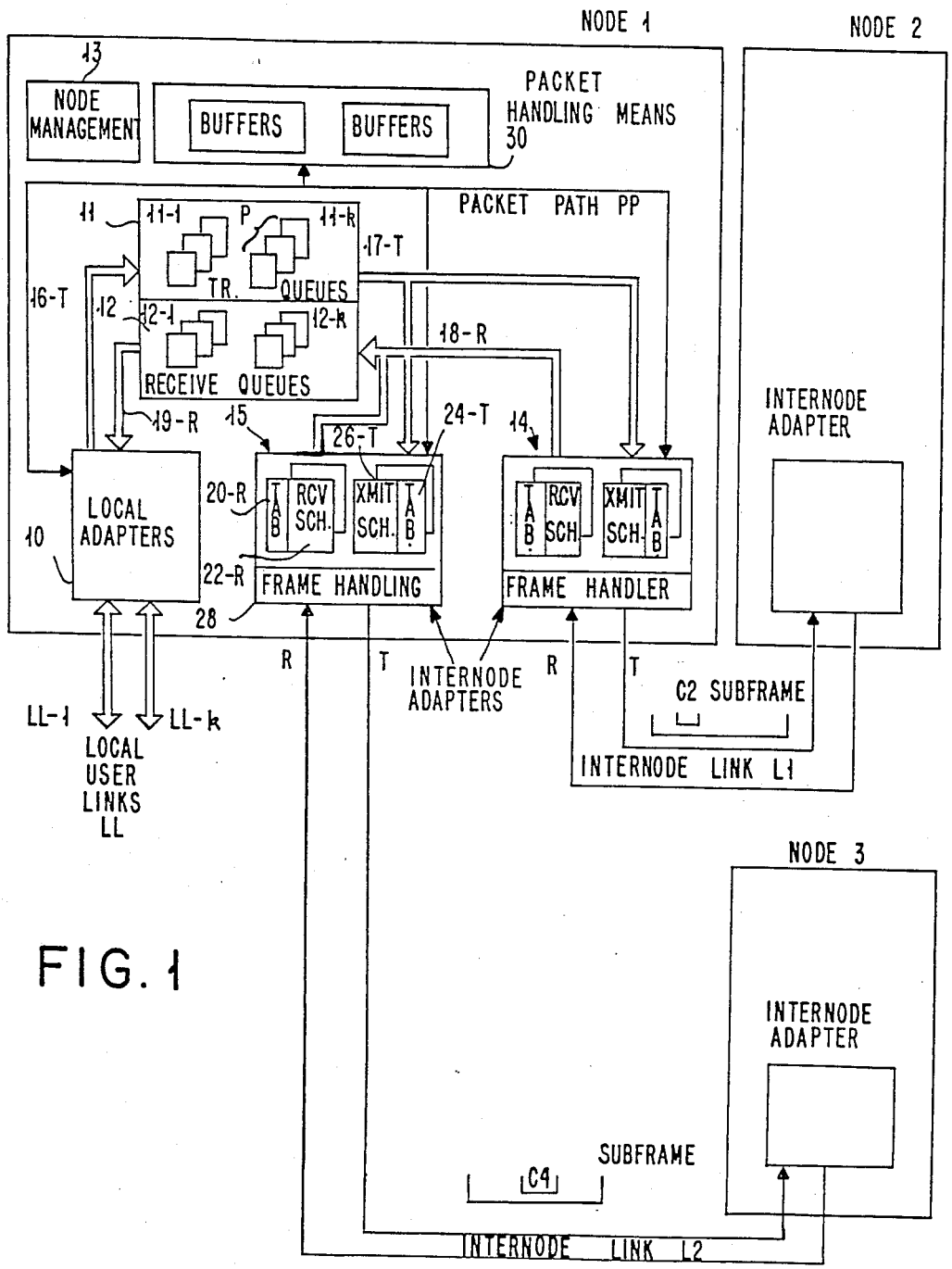
FIG. 1 schematically illustrates a telecommunication network incorporating the mechanism of the invention.

As shown in FIG. 1, the telecommunication network comprises a plurality of nodes. Only three such nodes: node 1, node 2, and node 3 are represented. The nodes are linked through links such as L1, L2, for transporting circuit switched bits and packet bits through the network in frames. In the frames, circuit slots are assigned to circuit users and the remaining part of the frames may be filled with packet switched bits. In FIG. 1, links L1 and L2 are assumed to be inter-node links used for long distance connections. The purpose of the mechanism according to the present invention is to optimize the bandwidth utilization on these inter-node links. Links LL are local links which are connected to local adapters. These adapters are similar to the adapters described in the above-referenced patent applications, except that the circuit switched bits are not transported on a fixed time multiplex bus such as described in the above-referenced applications.

According to the invention, pairs of transmit and receive queues 11 and 12 are provided. A pair comprising a plurality of receive and transmit queues 12-k and 11-b is assigned to the plurality of users which are attached to each local link LL-k.

The frames which are transported on the local and inter-node links may have the configurations described in FIGS. 2A-2C and in the above referenced patent application Ser. No. 892,649. The configuration of such frames will be described in reference to FIGS. 2A-2C.

The circuit slots which are defined in the complex frames such as described later on, are assigned to the users on all the links which are used for reaching the destination users from the originating users, on a per-call basis using a method and apparatus as described in U.S. patent application Ser. No. 892,649. Consequently the call set up and release procedures do not form a part of the present invention and will not be described in detail in this application. This is done under control of the node management means schematically represented by 13.

The inter-node links L1 and L2 are attached to inter-node adapters such as 14 and 15, respectively.

The bits in the circuit slots from the local users are stored in the transmit queues assigned to the respective users through bus 16-T and read through bus 17-T. The bits in the circuit slots to be received by the local users are stored into the receive queue assigned to the respective users through bus 18-R and read through bus 19-R to be sent to the destination local users.

For the sake of clarity, only the pair comprising receive and transmit queues 12-k and 11-k assigned to the maximum number p of users for which circuit slots may be defined on the network links will be considered.

There are p receive queues 12-k and p transmit queues 11-k, with queues 12-1 and 12-1 being assigned to user 1 on link LL-k and queues 12-p and 11-p being assigned to user p on link LL-k. Consequently, the circuit user data relative to each user are stored in the corresponding queues.

Depending upon the routes which have been marked in the nodes to connect the originating and the destination users, it may happen that some user data may have to be sent on an inter-node link such as L1 and some user data may have to be sent on another inter-node link such as L2.

To optimize the bandwidth utilization on the inter-node links, the circuit slots are shared by a plurality of users.

In FIG. 1, nodes 2 and 3 are assumed to be the destination nodes, however the calls may have to be transported through a plurality of intermediate nodes. The intermediate nodes in the present description are similar to the adapters described in patent application Ser. No. 892,649 which assumes that the boundary users for the same target boundary node share the same slot on the internode links.

It could also be possible to perform a queuing function in the intermediate nodes as done in the boundary nodes between local adapters and internode adapter. In that case, each circuit user sharing a slot is considered as a local user. The user data received from the receive leg of an inbound link are enqueued into assigned transmit queues and they are dequeued from these queues to be routed on the transmit leg of the selected outbound link of the intermediate node. In that case, the p user information received in a slot on a receive leg can be sent on several different transmit internode links.

To perform a full duplex communication, the data received from the receive leg of the outbound link are enqueued into the assigned receive queues and they are dequeued from these queues to be routed on the transmit leg of the inbound link.

The following description will be made assuming that the calls are routed on the intermediate links using the method and apparatus as described in the U.S. patent application Ser. No. 892,649 for the sake of clarity. To implement the slot sharing function in the intermediate nodes, it will only be necessary to provide internode adapters on each intermediate link which control the generation and reception of the frames on the intermediate links.

The circuit slot sharing is controlled by the inter-node adapters 14, 15 which are schematically represented in FIG. 1. They comprise receive marking table 20-R and receive scheduler 22-R and transmit marking table 24-T and transmit scheduler 26-T.

The marking tables are loaded during the call connection procedures through the node management means 13, so as to contain the circuit user numbers amongst the U1 to Up users which are assigned to the shared slot(s) on the inter-node links.

The receive and transmit schedulers cause the receive and transmit queues to be scanned according to a sequence which depends upon the user number assigned to the shared slot(s) and which may be varied depending upon the user activity.

The inter-node adapters such as 14 or 15 also comprise frame handling means 28, which allow the frames to be sent to the link or received from the link to be processed. The node also comprises packet bit handling means 30 which are connected to the adapters through packet path PP, and which allow the non circuit part of the frames to be filled with packet switched bits.

According to the present invention, a subchannel transporting an activity qualification information is associated to the circuit switched user channel. This qualification information relative to a given circuit switched channel is transported synchronously with the qualified slot.

For the purpose of illustration, it will be assumed that the frames to be transported on the network links have the structure shown in FIGS. 2A-2C.

As shown in FIG. 2-A, the medium frame is a complex frame CFi delimited by flags F, and which comprises a number of subframes comprising a fixed number of bits and residual bits r. The complex frame contains a number Nc of bits which vary only by one in the successive subframes. The complex frame has a duration equal to nT+e, T being the conventional time division multiplex slot duration. For the present time, this is equal to 125 microseconds. In the foregoing, n an integer equal to or higher than 1 and e is a value lower than a medium link bit period. The parameter n depends on the link speed and is calculated as fully described in the above referenced patent application.

The complex frame contains n subframes, each subframe having a duration equal to or less than T and containing an integral number Ns of bits. The Ns bits of a subframe are allocated to the transportation of a variable number of circuit switched bit slots. The number of slots depends upon the user need; two slots are represented in FIG. 2 FIG. 2A, and the remaining bits are allocated to the transport of packet switched bits.

The complex frames are delimited by a f-bit flag which is part of the R bits remaining at the end of the complex frame, with R=Nc-nNs. In cases where R is higher than f, the r=R-f bits are filled with packet switched bits.

According to the invention, any position of the qualification bits Caq relative to the circuit slots defined on a call basis in the subframes is possible.

All the Caq bits of a communications medium complex frame may be grouped altogether or the Caq bits of a subframes may be grouped together or the Caq bits can be concatenated with the circuit slot they qualify.

In FIG. 2-B, the activity qualification bits Caq1, Caq2, Caq3 for a subframe that contains three circuit slots: Cd1, Cd2, Cd3, are grouped at the end of the subframe.

The Caq bits are set to a first value (1), when the corresponding slot is filled with user data and set to a second value (0) when the corresponding slot is empty (no user activity). This setting of the Caq bits may be made by a user interface.

Two different types of user interfaces which may be used to attach voice or SDLC terminals are represented in co-pending, commonly-assigned patent application, Ser. No. 077,485 filed on the same day as the present application. This setting may be made as will be described later on by detecting whether the queues are empty or not. However in that case, a user interface is necessary to re-generate the complete user data as a function of the received Caq bits.

In FIG. 2-C each circuit slot Cdi has its own Caqi concatenated to it.

The medium links such as L1, L2, and LL-1 to LL-k have specific speeds and the complex frames on the different links may have different configurations if the mechanisms described in above referenced European patent applications are used. In that case, the parameters n, (number of subframes in the complex frames), Ns (number of bits in the subframes) and r (number of residual bits) are made known to the corresponding receiver means, so that the received bits may be processed.

The description of the present invention will be made assuming that the circuit user data are transported in 64 Kbps "C" subchannel (8 bits) with a 8 Kbps Caq subchannel (one bit), but this description can be genralized to any other interleave scheme.

In addition for the sake of clarity it is assumed that: a unique "C" circuit slot is shared by several circuit users, the maximum number of which is p. However p circuit users can be interleaved on a number q of circuit slots, the ratio (p/q) called the "Overbooking" ratio, is managed on per-call basis and given at the call setup time. It is a system parameter controlled by the network user.

In the detailed description of the invention it is assumed that q=1, and that there is one subframe per medium frame.

The scanning interleave mechanism must be adaptive because the number of users is not constant and even when constant, a user queue can be found empty.

According to the present invention, each user of the user pool which shares a circuit slot during a call, enqueues its user data and corresponding qualification bit into its respective user queue. In the transmit scheduler 26-T, a scanning mechanism which will be decribed later on, causes the queues to be sequentially scanned and read.

When the Caq bit is found equal to 0, the slot associated with it is given to the residual bit stream for P packet users, only the Caq bit is transported.

When the Caq bit is found equal to 1, the slot belongs to the one of the circuit users sharing the slot.

In consequence, when all the queues are empty, Caq is equal to 0 in every communications medium frame and all circuit slots are given to the packet bit stream.

When all queues are not empty i,e., when they contain at least one user data byte, the bytes are interleaved in sequential order in the shared circuit C slot in successive medium frames.

When one queue (user i for example) is found empty and it was found not empty during the previous scan period, the scanning sequence has to be modified to release user i from the scanning process. To do so, a scanning change information is sent in place of the Ui data slot, but the receiver end must be informed of this change. This is the function of the Caq: the Caq goes from 1 to 0 to give the scanning change information, and the corresponding Cd data byte is given to the residual packet stream following the common rule Caq=0, and the circuit slot belongs to packet traffic.

The next slot is used to transfer the user change information with Caq=1. At the receiving end, when a slot having a Caq=0 is recognized, the associated slot in the next frame with Caq=1 is analyzed by the scanning mechanism and the corresponding Cd byte which contains the user change information i.e. user number Ui along with the DELETE information, causes the scanning process to be changed.

At the next scan period, when the scanning goes from user p to user 1, if the Ui queue or another queue that was previously empty is found not empty, the scanning sequence is changed thru the same mechanism but ADD information is sent instead of DELETE.

It would be possible to use 2 Caq bits: one for circuit C versus packet P, and one for scanning change information. This mechanism would be more appropriate in case of very short activity/inactivity period, i.e one slot active, one inactive, etc.

Transmit and receive schedulers 26 and 22 which allow these operations to be performed will now be described in reference to FIGS. 3 and 4.

The queues 11-k are loaded from the local adapters through enqueuing means 80, which cause the received user data and Caq bits from bus 16-T to be stored into the respective user queues through bus 81. A queue pointer 82 is associated to each queue, the pointer value is incremented by one each time an information is written into the corresponding queue through the increment signal generated on line 84. The pointer value is decremented by one each time an information is read from the corresponding queue through the decrement signal generated on line 86.

The queue and pointer address to be read through the transmit scheduler is provided on bus 88 by address decode circuit 90. The information read from the selected queue is provided on bus 92 and the corresponding pointer circuit provides on line 94, a signal which is at zero when the queue is found empty and at one when the queue is not found empty.

Marking table 24-T, which is loaded on the per-call basis through the node management means 13, contains the addresses of the queues which may share the frame slot (or slots as the case may be), and a presence bit is stored in correspondence therewith. This bit is set at 1, when the corresponding user queue is to be scanned and is set at 0 when the corresponding user queue is not to be scanned.

The marking table 24-T may be read or written under control of READ or WRITE control signal which are provided on lines 100 and 102. The address positions which are accessed are provided on address bus 104. The queue address and corresponding presence bit may be read, but only the presence bit may be written to indicate a scanning change.

Counter 106 counts from 1 to p (with p=32 in the implementation of the invention), to generate the address of the table position which is to be read. Counter 106 is incremented (or not) under control of incrementing circuit 108.

The inter-node adapter provides a signal C ENABLE AT SLOT N X line 110 which is active during the duration of the time slots assigned to the pool of users.

The function of AND gate 116 is to provide on its output line, a signal which is active to initiate the scanning of the marking table 24-T. Inverter 111 and latch 118 have a function of conditioning AND gate 116 during the first pulse of the scan control clock signal on line 120 occurring when the signal on line 110 becomes active. The frequency of the scan clock signal is chosen so as to allow all the positions of the marking table to be scanned during the duration of the active signal on line 110, if necessary.

Inverter 111 inverts the signal on line 110 and provides a signal to the reset input of latch 118. The set input of latch 118 is connected to the output of AND gate 116. The inverted - output of latch 118 is provided to one input of AND gate 116. The three other inputs of AND gate 116 are connected to lines 120, 110 and to the output of circuit 112. As will be described later on, the function of circuit 112 is to inhibit the scanning of the marking table when the add or delete information has to be sent.

Thus, AND gate 116 provides a signal which is active during the first pulse of the scan clock signal when the signal occurring on line 110 becomes active.

The output line of AND gate 116 is connected to one input of OR gate 122 which provides on its output line 100, the increment signal to counter 106 and the read control signal of marking table 24-T.

The counter content is provided through bus 126 to AND gate assembly 128 which is conditioned by the signal on line 100. The outputs of AND gate assembly are provided to OR gate assembly 130 which provides on its output bus 104, the address of the marking table.

Thus, at the beginning of the scanning process, AND gate assembly 128 is conditioned and the first position of the marking table is read. The presence bit which is provided on line 132 is applied to one input of OR gate 134, the output signal of which is inverted in inverter 136. The output signal from inverter 136 is provided to one input of AND gate 138 which receives on its second input the scan clock signal from line 120. The output signal from AND gate 138 is provided to the second input of OR gate 122. This generates a signal on line 100 which causes the counter 106 to be incremented if the presence bit is found equal to 0 and then the next table position to be read is identified by the counter.

The following position of the marking table is read, if the presence bit is found equal to 0, and the counter is still incremented. It is incremented until a presence bit is found equal to 1, or until a presence bit change is detected.

If the presence bit is found equal to 1, OR gate 134 provides a signal on its output line 140, which causes the counter incrementation to be stopped.

The queue addressed position is read from marking table 24-T and its content is provided through bus 144 to address decode circuit 90. The queue pointer 84 is read and if it is found to a value different from zero, indicating that the queue is not empty, a signal is generated on line 94. This signal is provided to one input of XOR circuit 146, which thus provides an inactive signal indicating that the presence bit is not to be changed. This signal is provided to one input of OR gate 148, the output signal of which is inverted in inverter 150. The output signal from inverter 150 is provided to one input of AND gate 152, which is conditioned by the active signal on line 110. This generates a LOAD signal which causes the information read from the addressed queue to be transferred into register 154 to be inputted to serializer deserializer 156 through OR gate 158 to be sent to the circuit path CP in the frame handling means 28 which will be described later on. The active output signal on line 86 causes the pointer value to be decremented.

The output signal from XOR circuit 146 is provided to inverter 160, the output of which is provided to one input of OR gate 162. This gate generates on line 164, the XMIT Caq INFO signal, which in that case is set to one and inputted into the left most position of the serializer-deserializer 156 to be sent with the user data byte.

The XMIT Caq INFO signal is also provided to the frame handling means 28, to generate the CIRCUIT ENABLE signal as will be described later on.

If the queue pointer is found to a value indicating that the queue is empty, a zero is generated on line 94 and XOR circuit 146 provides an active signal indicating that the presence bit in this position has to be changed from 1 to 0.

XOR circuit provides an active signal (1), which is provided to one input of OR gate 134 so that the incrementation of counter 106 is inhibited through inverter 136 and AND gate 138.

Figure 7:
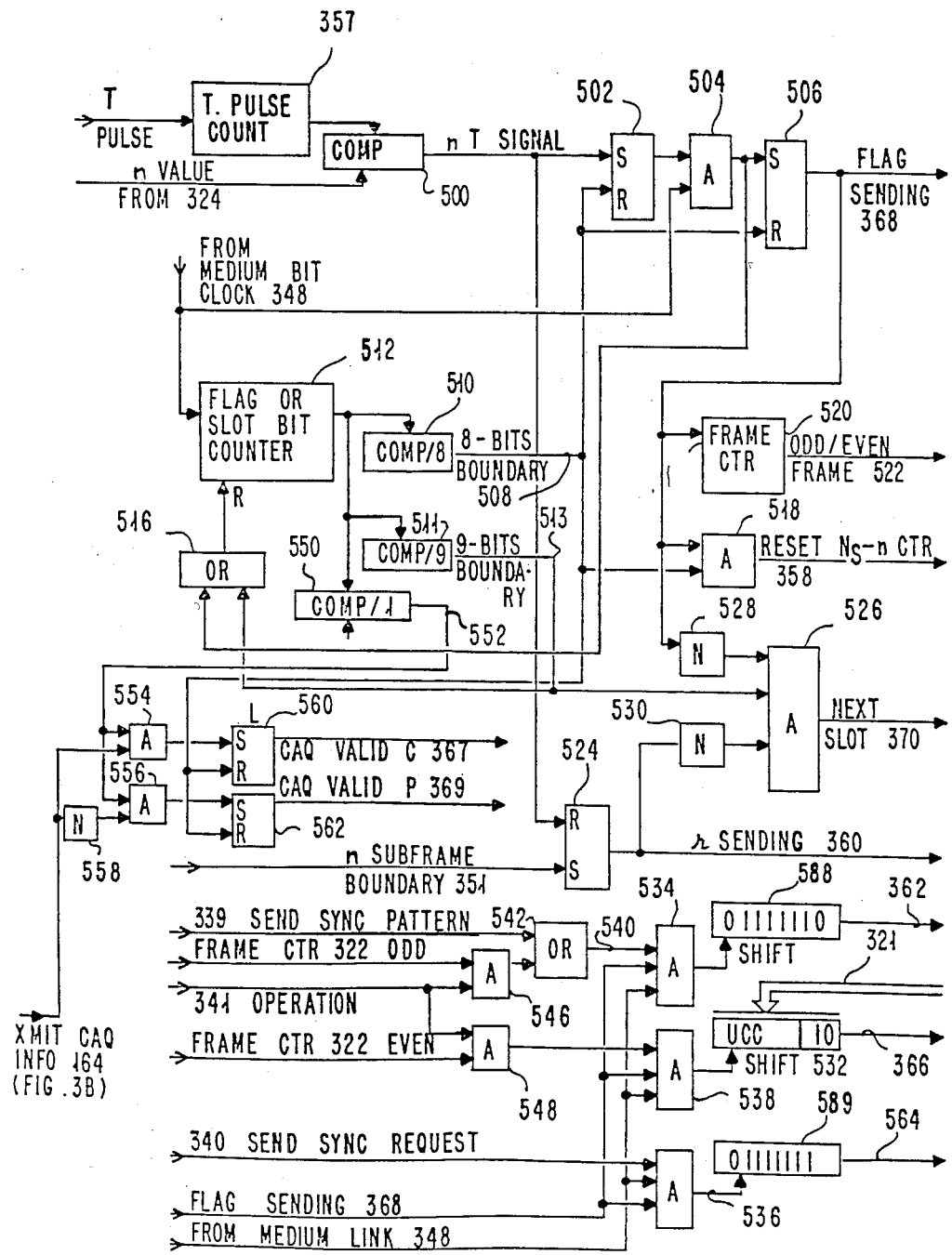
FIG. 7 represents circuit 356 of FIG. 5.

This signal sets latch 166 in circuit 112 which is reset on the 9th bit time of the slot. The 9th bit time signal is provided by frame handling means 28 on line 513 (FIG. 7). The output signal of latch 166 is inverted in inverter 168, and the output signal from inverter 168 is provided to one input of OR gate 162, which thus provides a 0 XMIT Caq INFO signal on line 164. This signal is sent to frame handling means and allows the slot to be filled with packet bits.

The signal at the output of latch 166 sets latch 170 which is reset at the 9th bit time of the slot by means of AND gate 172 which receives the signal on line 110 and the 9th bit time signal as its control inputs.

AND gate 174 has three inputs: the first one is connected to the output of latch 170, the second one is connected to line 110 and the third one is connected to the output of inverter 168. The output of AND gate 174 is provided to one input of AND gate 116 through inverter 176.

Thus, when a presence bit change is detected during the slot assigned to the selected user queue, the signal at the output of AND gate 174 is active during the next slot time assigned to the user queue pool, and inactive during the current slot time.

The output of AND gate 174 is provided to one input of AND gate 178 which is conditioned by a signal on line 110, i.e. during each slot time assigned to the queue user pool.

Thus, during the current slot time, AND gate 178 provides on its output line 102, an inactive signal. AND gate 152 provides an inactive signal so that the content of the selected queue may not be inputted into register 154.

The Q EMPTY signal on line 94 and the presence bit read from the marking table inverted in inverter 182 are provided to AND gate 180. This generates on its output line the ADD/DELETE bit which is equal to 0 in this case.

During the next slot, AND gate 178 provides on its output line 102 an active WRITE signal, which causes the 0 ADD/DELETE bit to be written into the marking table at the address selected during the preceding slot. Also, it causes the content of counter 106 to be loaded into register 186, and the content of register 186 to be written into register 188 together with the 0 ADD/DELELE bit. During this slot, since the output of inverter 168 is active, the XMIT Caq INFO signal is set to 1 and provided to the left most position on the serializer/deserializer 156 to be transmitted on the CP path together with the content of register 188.

At the next slot time, latch 172 will be reset, and the output signal from inverter 168 will be active to restart the counter incrementation and to read the following position of the marking table 24.

When a presence bit equal to zero is read and when the queue is found not empty, XOR circuit 146 provides an active 1 signal and the same operation as described previously is performed except that the ADD/DELETE bit is set to 1 instead of 0 through AND gate 180.

The RCV scheduler and marking table 22-R and 20-R will now be described in reference to FIG. 4.

The received bits from the circuit path CP from frame handling means 28 are inputted into serializer/deserializer 200 at the communications medium link bit clock rate.

The latched RECEIVE Caq INFO signal is received from frame handling means 28 on line 202.

The scanning of the receive marking table 22-R which is loaded on the per-call basis through the node management means 13, is controlled by search counter 204.

Counter 204 is incremented under control of incrementation circuit 206. The scan control clock signal is provided to circuit 206 by line 208. Means 28 provides a signal which is active on line 210 during the time duration of the slot assigned to the queue user pool.

In circuit 206, AND gate 216 provides a signal on its output line 218 to start the scanning process. Its first input is connected to the scan control clock line 208, the second input is connected to line 210, the third input is connected to line 220 through inverter 222 to inhibit the incrementation of the counter, in case a presence bit change is detected, as will be described later on, and the fourth input is connected to line 224. Line 224 is the inverted output line of latch 230 which is set by the output signal from AND gate 216 and reset by the signal on line 210 inverted in inverter 228. Thus when signal on line 210 becomes active, the signal on line 224 is active. If no change was detected during the preceding slot, the signal at the output of inverter 222 is active, and AND gate 216 provides an active signal during the first scan control clock pulse. This signal is provided on the output line 234 of OR gate 232 and causes the content of the counter 204 to be incremented. It also causes a READ signal to be provided to the marking table 22-R and AND gate assembly 236 to be conditioned to provide the counter value through OR gate 238 on the table address bus 240.

The addressed position of marking table is read. The presence bit is provided on line 242, it is inverted in inverter 244.

If the presence bit is equal to 0, AND gate 246 is conditioned. Then the scan control clock which is provided to one of its inputs, is provided on line 234 to cause the counter to be incremented.

During the slot duration, marking table 22-R is read until a presence bit is found equal to 1. At that time, AND gate 246 is conditioned, and counter 204 is no more incremented. If the Caq bit is equal to 1, (meaning that no scanning change has to be made) the content of serializer/deserializer 200 has to be written into the queue addressed by circuit 254.

The RCV Caq INFO on line 202 is set at 1 so that AND gate 248 and AND gate assembly 250 are conditioned. The 9-bits assembled in the serializer/deserializer 200 are stored into the queue selected by the address value provided on table output bus 252 and decoded in circuit 254. The corresponding queue pointer 256 is incremented through the signal on line 258 at the output of AND gate 248.

The function of dequeueing means 260 is to dequeue the information read from the queues to provide the user circuit data on bus 19-R. Each time a queue position is read the corresponding queue pointer 256 is decremented.

If the RCV Caq INFO is equal to 0, meaning that the corresponding slot has been filled with packet bits, the transfer of the serializer/deserializer content to the addressed queue is inhibited through AND gate 250.

The RCV Caq INFO on line 202 is inverted in inverter 262. The output line of inverter 262 and line 210 are provided to AND gate 264. The output signal from AND gate 264 sets latch 266. At the next slot time, the RCV Caq INFO signal on line 202 will be equal to 1 meaning that the slot contains the ADD/DELETE user queue information.

Consequently, at this next slot time, inverter 268 which inverts the output signal from AND gate 264 generates an active signal. AND gate 270 has three inputs: the first one is connected to the output of inverter 268, the second one is connected to the output of latch 266 and the third one is connected to line 210. Thus it generates an active signal on its output line 272. This output line is the WRITE line of the marking table. It also conditions AND gate assembly 274. Thus the serialier/deserializer content is transferred onto the table address bus 240 to address the position of the marking table where a change is to be made and the corresponding add/delete bit as the case may be, is stored into the presence bit position.

At that time, the part of the serializer-deserializer (serdes) content indicating the queue user number which has been added or deleted, is forced into the counter 204 through AND gate 276 which is conditioned by the WRITE signal on line 272. This allows the scan process to be restarted at the next position following the position which has been changed.

In the internode adapters, there are receive and transmit schedulers per slot or plurality of slots which may be assigned to a pool of users, on the link.

Figure 5A:
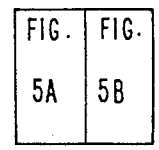
FIG. 5 illustrates how FIG. 5-A and 5-B have to be assembled.
Figure 5:
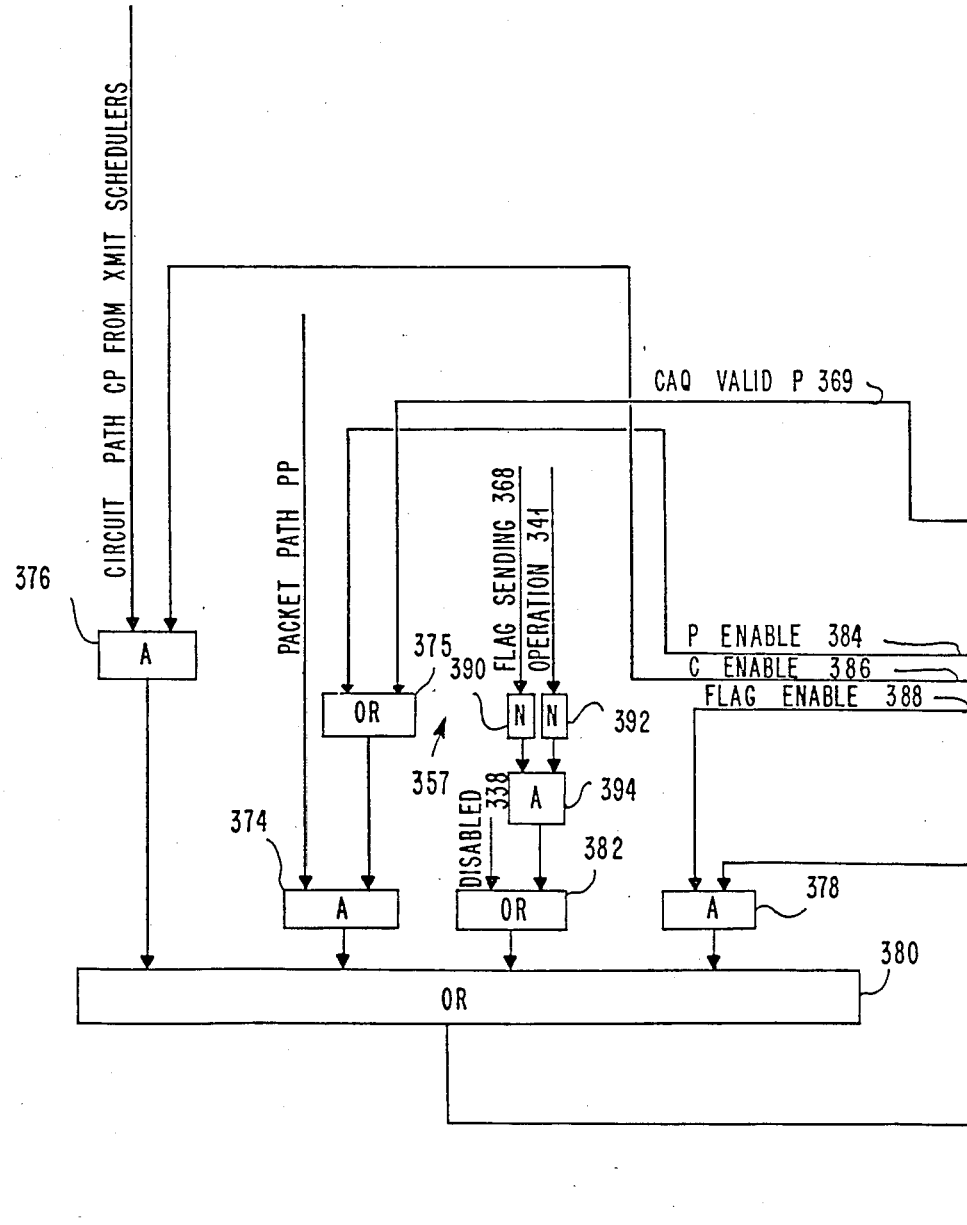
Figure 5B:
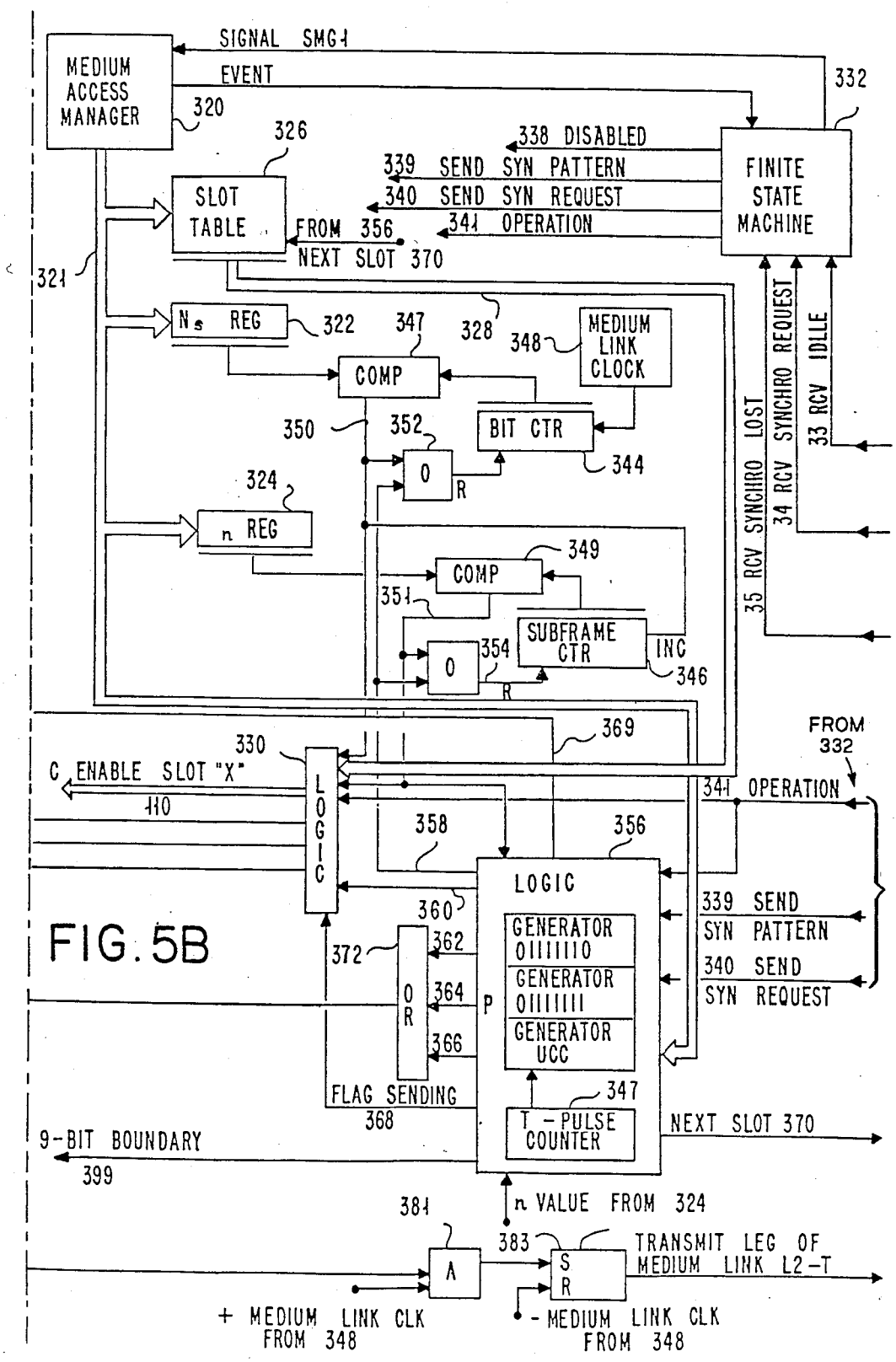

FIG. 5 (comprising FIGS. 5-A and 5-B) shows the transmitting means of frame handling means 28, which allows the circuit user bits from the transmit schedulers to be sent on the medium link such as L2 to reach node 3 in FIG. 1.

In the preferred embodiment of the invention the slot assignment on the links which are used for routing the calls, is controlled on the call basis through the mechanism described in above referenced patent applications, wherein each node comprises a switching table which is updated by the node service manager so as to correlate the user pool numbers to the complex frame slot numbers on the transmit leg of the output link which is selected for routing the call.

In the transmitting means, the medium link access manager 320 computes the link parameters as described in the above referenced patent applications, and provides event indications to finite state machine 332, EMG1, 2, 3 and receives signal SMG3 from finite state machine 332, which are described in detail in said patent applications and will not be described here any further.

The medium link manager 320 provides through output bus 321, the link parameters Ns, n and the slot allocation to registers 322 and 324 and to slot table 326 respectively. Slot table 326 contains for each circuit slot of the subframe (or of the subframes, as the case may be) the corresponding user pool number.

At each subframe generation, the slot table is read and its output 328 is used in logic circuit 330 to generate packet or circuit P or C ENABLE signals, which determine whether the packet or circuit parts of the subframe shown in FIG. 1, on the per-call basis are used, and determine the C ENABLE SLOT "X". signals which are active during the slot durations assigned to each user pool. These signals are provided on bus 110 to be provided to the transmit scheduler.

The medium access protocol is managed through finite state machine 332 which is a logic device providing control signals when specific events occur. It is connected to the output bus 321 and to three lines 333, 334 and 335 from the associated receiving means, said lines carrying the RECEIVE IDLE PATTERN, RECEIVE SYNCHRO REQUEST and the RECEIVE LOST SYNCHRO signals, respectively. Depending upon the received events, unit332 generates on its output lines 338, 339, 340, 341 control signals: DISABLED, SEND SYNCHRO PATTERN, SEND SYNCHRO REQUEST and OPERATION,respectively. This will not be described in more detail since a complete description may be found in above referenced patent applications.

Bit counter 344 working under control of a clock 348 operating at the medium link speed, counts the bits and counter 346 counts the subframes. The contents of counters 344 and 346 are compared with Ns and n registers 322 and 324 by comparators 347 and 349. The output 350 of comparator 347 is provided to subframe counter 346 so as to cause this counter to be incremented each time an equality is detected by comparator 347.

Outputs 350 and 351 of comparators 347 and 349, and output 328 of slot table 326 are provided to logic 330 to generate the P ENABLE, C ENABLE, C ENABLE SLOT "X" and FLAG ENABLE signals at the correct times to build the complex frame to be sent on transmit leg of medium link L2.

Logic 330 also receives the OPERATION control signal from finite state machine 332.

Flag and r sending logic control circuit 356, working under control of T-pulse counter 357, medium link bit clock 348 and output 351 of comparator 349, allows specific patterns to be sent on the medium link at given instants under control of the signals on output line 339, 340 and 341 of finite state machine 332. It also provides a reset counter signal on its output line 358. Output line 358 and output lines 350 and 351 of comparators 347 and 349 are provided to OR circuit 352 and 354 which provide the reset signal to bit and subframe counters 344 and 346, respectively.

Circuit 356 also generates on output line 360, an r sending control signal which is provided to logic circuit 330 so as to cause the r residual packet bits to be sent on the medium link.

The different flags are generated by circuit 356 on output lines 362, 364 and 366. Different flags have to be sent at given times. In a specific embodiment, 01111110 is the normal complex frame delimiter, abort flag 01111111 is used to request the synchronization and UCC flag is used for indicating to the receiving means that a circuit user is to be added or deleted on a call basis, as described in above referenced patent applications.

Consequently, circuit 356 generates the medium 01111110 flag under control of OPERATION and SEND SYNCHRO PATTERN signals on lines 341 and 339 from finite state machine 332.

Circuit 356 generates the specific 01111110 flag under control of SEND SYNCHRO REQUEST line 340 from finite state machine 332.

Circuit 356 generates the USER CIRCUIT CHANGE pattern UCC which is used for changing the user slots in the subframes on the call basis. This pattern is changed under control of the medium access manager 320, so that circuit 356 receives the pattern to be generated on bus 321.

The flag outputs 362, 364 and 366 of circuit 356 are provided to OR circuit 372.

Circuit 356 also generates a flag sending control signal on line 368 which is provided to logic 330 and which is also used during the initialization period to prevent the idle 1111111 . . . configuration from being sent on the medium link during the flag sending period.

Circuit 356 generates a next slot signal on line 370 which is provided to the slot table 326 to cause the table to be scanned in order to have the P and C indication to be provided to logic 330 through output bus 328 of slot table 326.

Figures 3, 3A:
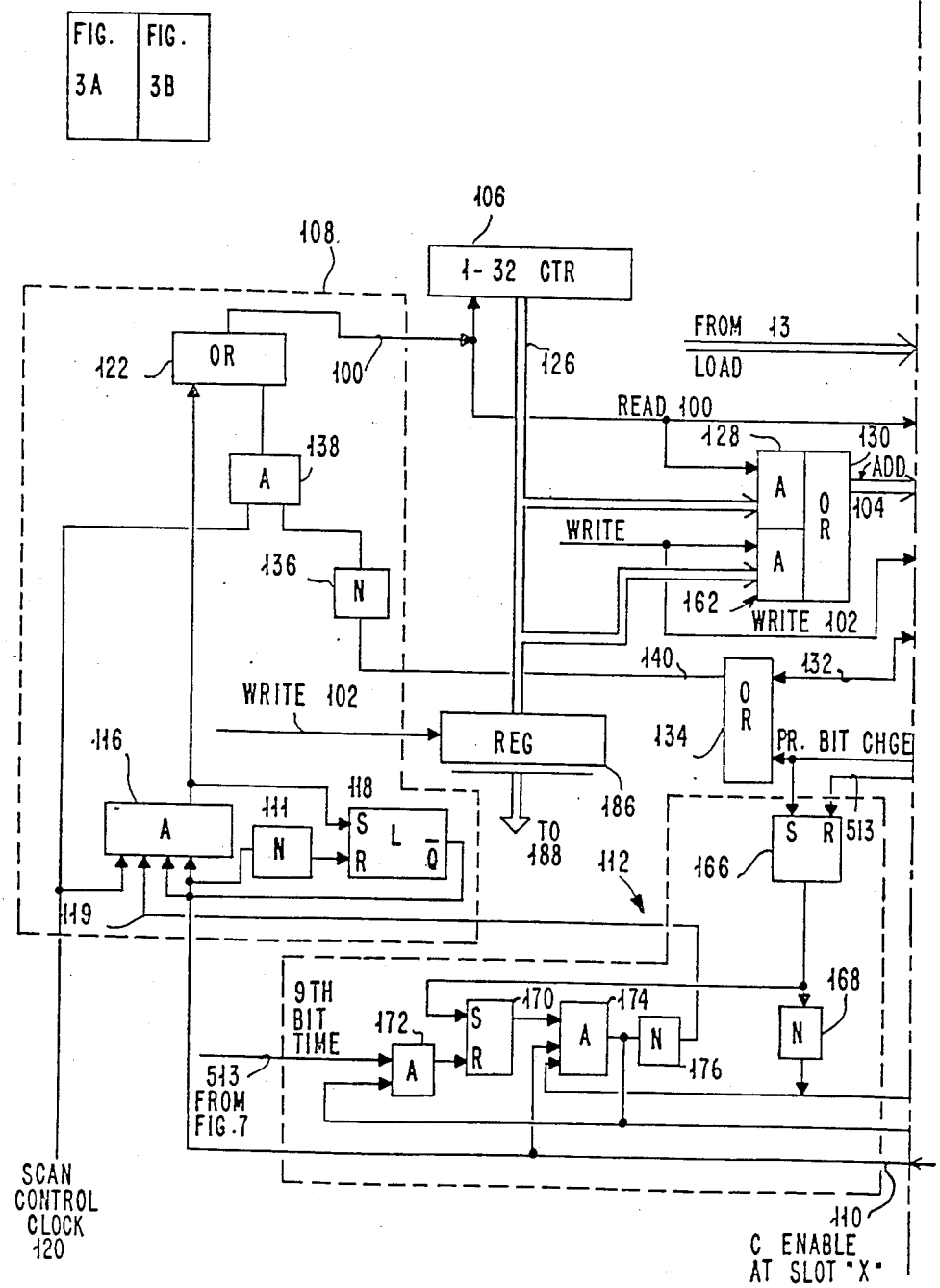
FIG. 3 illustrates how FIG. 3A and 3B have to be assembled.
FIGS. 3A and 3B illustrate the marking table and transmit scheduler relative to a user queue pool sharing the same slots.
Figure 3B:
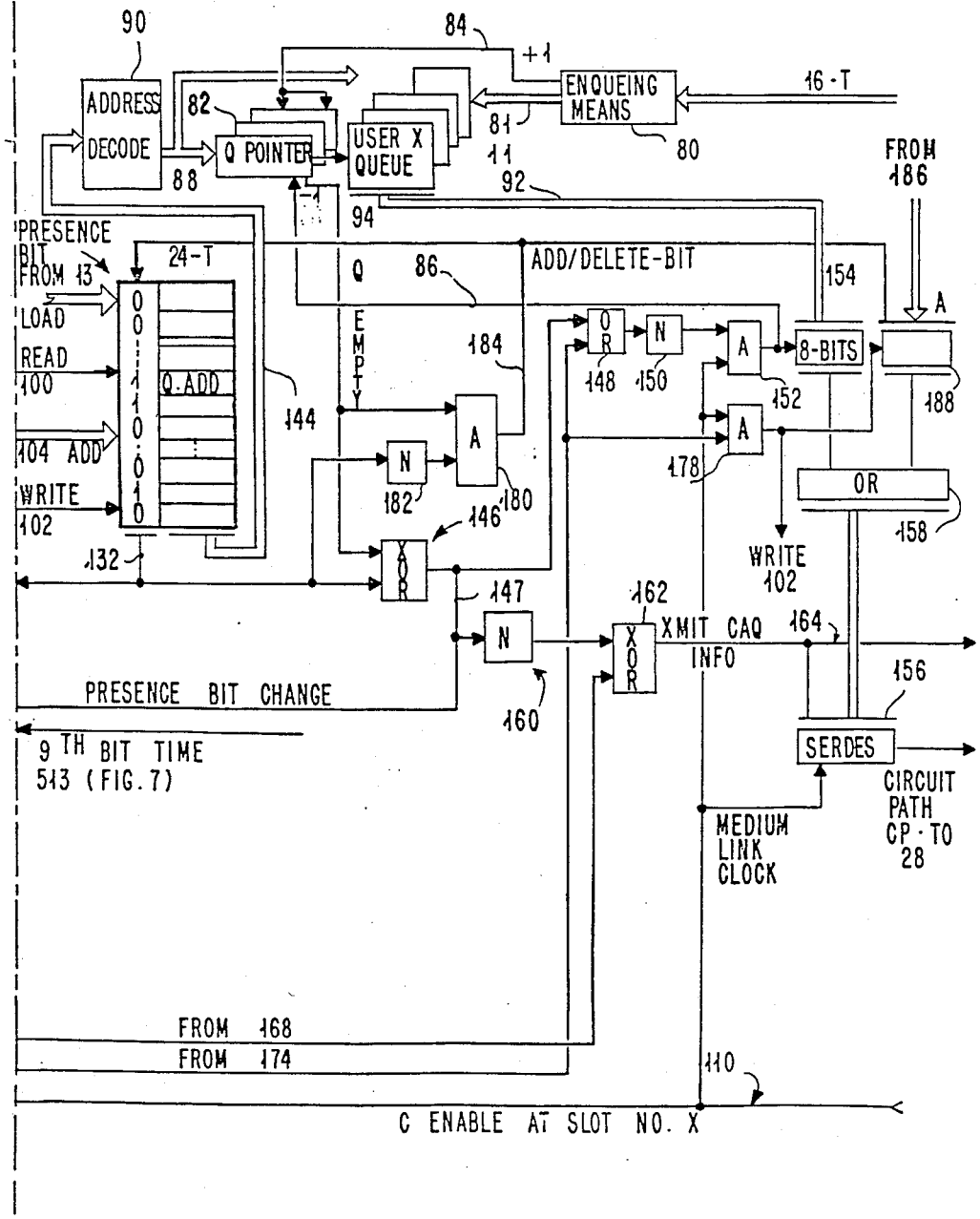
Figure 4:
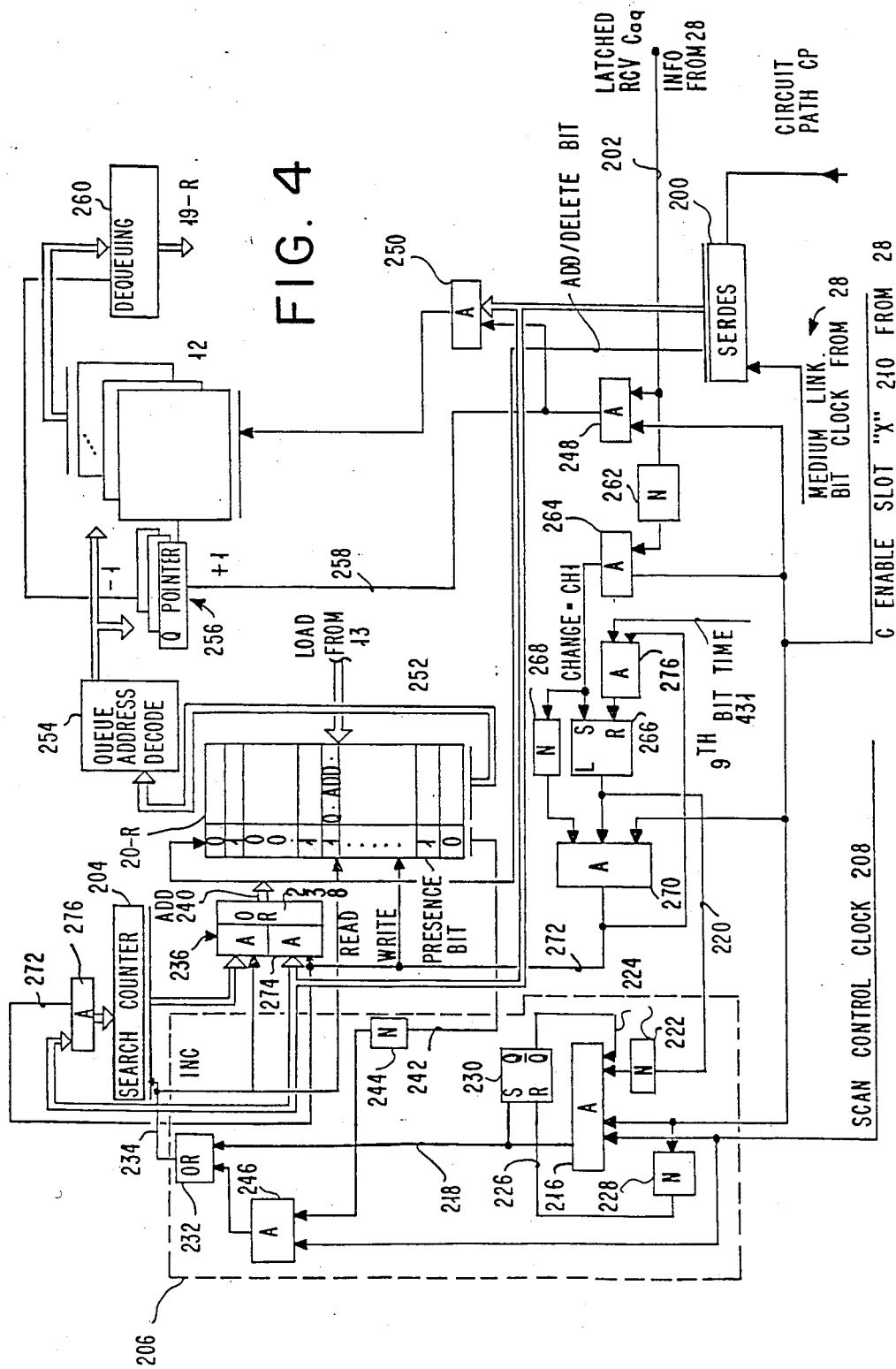
FIG. 4 represents the marking table and receive scheduler relative to a user queue pool sharing the same slots.

According to the present invention, circuit 356 generates Caq VALID P signals on line 369 which are used to gate the bits on the circuit CP paths from the schedulers as shown in FIG. 3 or from the packet PP path, to the medium link depending upon the Caq value.

The packet user bits from PP path, the circuit user bits from CP path, or the specific patterns from the output of OR circuit 172 are transmitted on transmit leg of medium link L2 at specific instants to build the complex frames through the gating arrangement 357 and circuits OR 380 and 382 and AND gate 378, shown in FIG. 5-A.

AND gate 378 receives the FLAG ENABLE signal from output line 388 of circuit 330 and the specific flag patterns from the output of OR circuit 372.

OR circuit 382 receiving the DISABLED signal from output line 338 of finite state machine 332, has its output connected to OR gate 380 so as to send the idle configuration 11 . . . 111 on the medium link through AND gate 381 (FIG. 5-B) and latch 383 when the DISABLED signal is active.

AND gate 394 receiving the OPERATION signal from line 341 inverted by inverter 392 and the flag sending control signal from line 368 of circuit 356 inverted in inverter 390, has its output connected to OR circuit 382 to send the all mark 11 . . . 111 configuration on themedium link during the initialization period, between flags.

AND gate 374 receives on one of its input, the packet bits provided by the packet handling means on path PP and on its second input, a signal which is active when Caq VALID P signal on line 369 or P ENABLE signal on line 384 are active. This conditioning signal is generated by OR gate 375 whose inputs are connected to lines 369 and 384.

The circuit switched bits are sent on the transmit leg of medium link L2 through AND gate 376. Gate 376 has one input connected to the C ENABLE line 386 and its other input connected to CP paths from the transmit schedulers.

The outputs of AND gates 374, 376 and 378 and the output of OR gate 382 are provided to OR circuit 380. The output of OR circuit 380 is provided to AND gate 381 which is conditioned when the medium link clock signal is positive, for example. The output of AND gate 381 sets latch 383 which is reset when the medium link clock signal is negative. Thus latch 383 provides on its output the bits to be transmitted on the transmit leg of medium link such as L2.

The detailed implementation of circuit 356 will be described later in reference to FIG. 7.

Figure 6A:
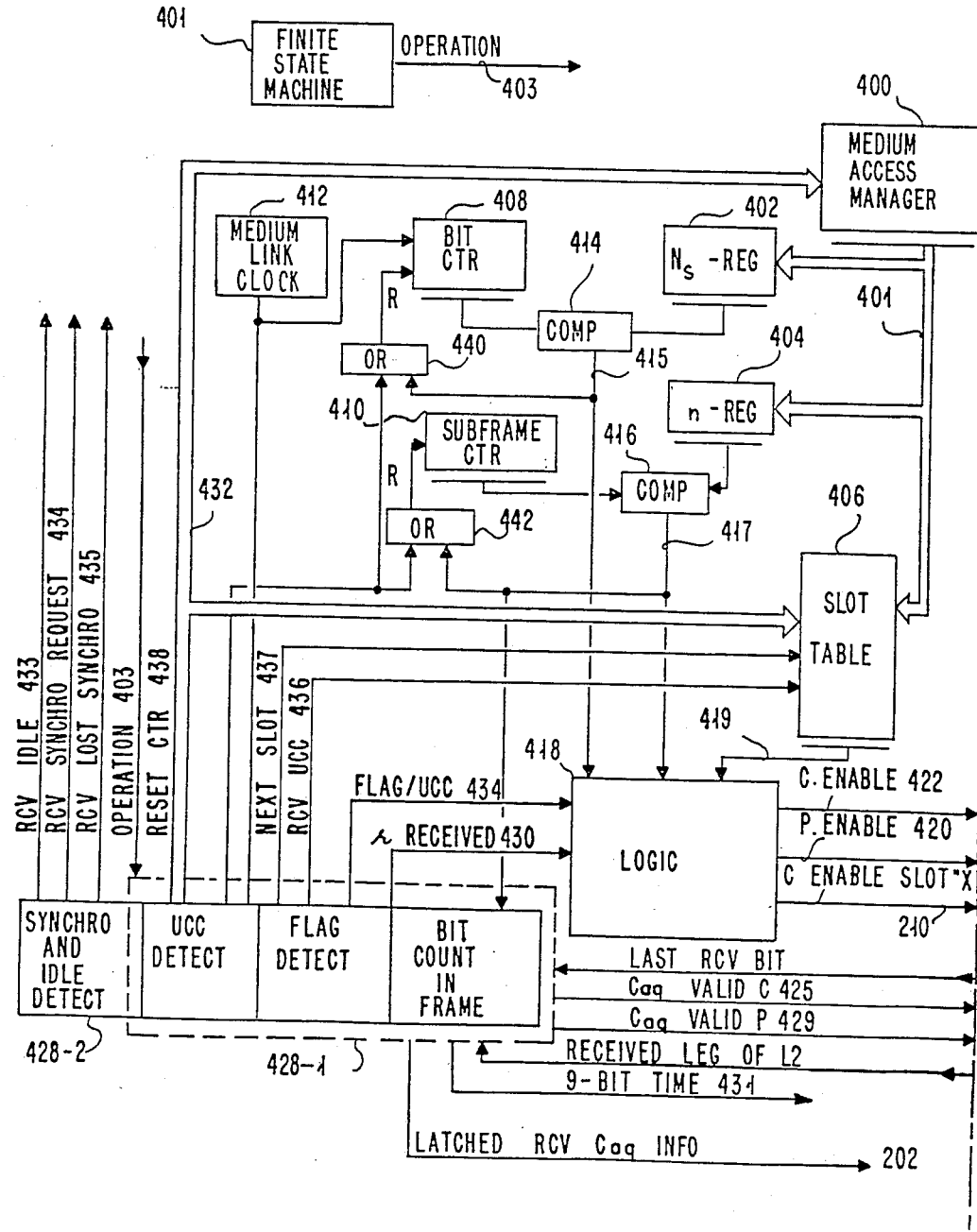
FIG. 6 illustrates how FIGS. 6-A and 6-B have to be assembled.
Figure 6B:
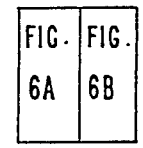
Figure 6:
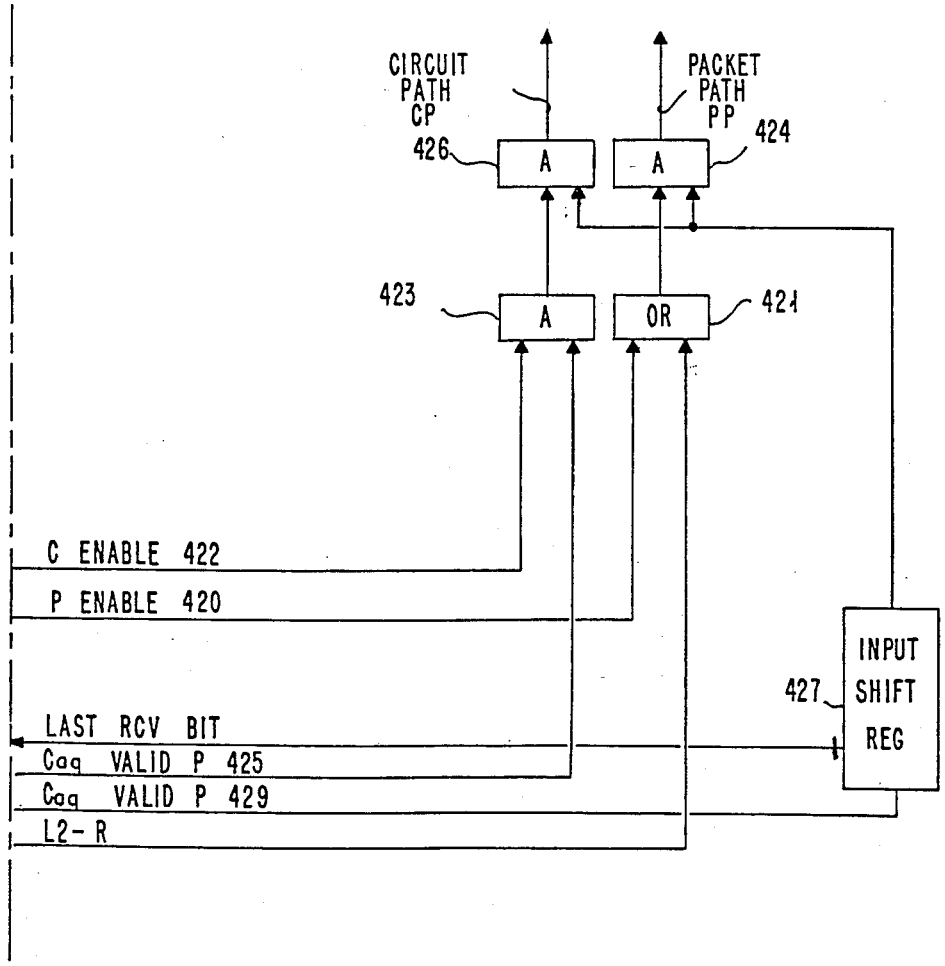

FIGS. 6-A and 6-B show the receiving part of circuit 28, which receives the complex frames from the receive leg of the medium link such as L2.

This part comprises a medium access manager 400 and a finite state machine 401, which may be the same as the medium access manager and finite state machine 332 in the transmitting part. Only the OPERATION output line 403 which is needed for the receiving operation is represented.

The link parameters have to be known from the receiving means. In the specific embodiment of the invention they are found in the receiving means by consulting tables containing the correlation between Nc and the desired parameters, Nc being the number of bits received between two flags during the initialization period, and being an indication of the link speed.

The medium link parameters are loaded into Ns-register 402, n-register 404 and slot table 406 through output bus 401.

The receiving means comprises a bit counter 408 and a subframe counter 410. Bit counter 408 works under control of medium link clock provided by circuit 412. Comparator 414 compares the content of counter 408 and Ns-register 402 and comparator 416 compares the content of counter 410 and n-register 404 so as to generate signals on their output lines 415 and 417 which are active when an equality is detected. Output lines 415 and 417 are connected together with the output line 429 of slot table 406 to logic circuit 418. Logic circuit 418 generates P ENABLE and C ENABLE signals on output lines 420 and 422 respectively, and the C ENABLE SLOT "X" signals on bus 210 to be provided to the receive schedulers.

The C ENABLE signal is provided to one input of AND gate 423 which is conditioned by a Caq VALID C signal generated by circuit 428 on line 425 and the P ENABLE signal is provided to OR circuit 421 together with a Caq VALID P signal generated by circuit 428.

The received bits on the receive leg of link L2 are provided to two AND gates 424 and 426 by means of a 8-bit shift register 427. AND gates 424 and 426 are conditioned by the output signals provided by OR gate 421 and by AND gate 223.

The output of AND gate 424 is provided to the packet path PP and the output of AND gate 426 is provided to the circuit path CP.

Circuit 428 generates the latched RCV Caq INFO for each scheduler to be sent on line 202 and generates a signal on line 431 which is active during the 9th bit boundary time.

The received bits are also provided to circuit 428 which comprises means 428-1 for detecting the flags and counting the bits in the complex frames. In normal mode of operation, i.e. after the initialization period, "r Received" output line 430 of circuit 428 is activated so as to cause the P-ENABLE signal at output of logic 418 to be activated so that the r residual bits are provided to the packet switched bit handling facility through AND gate 424.

It also detects the UCC flags which are transmitted to the slot table through bus 432 so that the receiving means takes into account the circuit user changes transmitted by the transmitting means. This causes the receiving means to generate the RCV UCC signal on line 436 and the next slot signal on line 437. This causes the content of slot table 406 to be scanned to activate the P and C ENABLE signals according to the subframe configurations built on the per-call basis.

Circuit 428-1 generates a reset CTR signal on line 438 which is provided to OR circuits 440 and 442. The output lines of comparators 414 and 416 are also provided to OR circuits 440 and 442 whose outputs control the resetting of counters 408 and 410.

The function of shift register 427 is to delay the received bits in such a way that the flag detection may be performed in circuit 428.

Circuit 428 detects the flags in the received bits and from this flag detection and the counting of bits, part 428-2 detects when the synchronization is lost to generate the RCV LOST SYNCHRO and RCV SYNCHRO REQUEST on lines 435 and 434. It also detects the all mark 11 . . . 111 received bit stream to generate the RCV IDLE signal on line 433. These three signals are used by the transmitting means of the receiving adapter.

Inasmuch as the present invention is embodied in the mechanisms described in above referenced patent applications, the initialization and call initiation processes are performed as described in said applications and will not be described herein.

Circuit 356 will now be described in reference to FIG. 7.

In circuit 356, counter 357 counts the T (125 microseconds) periods, the T-pulse count at the output of counter 357 is compared with the n value provided by register 324 by comparator 500. Comparator 500 provides an active signal when an equality is detected, this active signal indicating an nT boundary. When an nT boundary is detected, latch 502 is set. The output of latch 502 and the output of medium link clock 348 are provided to AND gate 504. The output of gate 504 sets FLAG latch 506 which thus provides on its output 368 the FLAG SENDING control signal which is active at the bit clock time following an nT boundary. Latches 502 and 506 are reset by the signal on line 508 at the output of comparator 510.

Comparator 510 compares with the value 8 the content of flag or slot bit counter 512, which counts the medium link clock from 348. The counter is reset at the medium link clock pulse following an nT boundary or at the 9-bit boundaries. The 9-bit boundaries are detected by comparator 511 which compares the count provided by counter 512 with 9 and provides a signal on its output line 513 which is active at the 9th-bit times.

Counter 512 is reset through OR gate 516 whose inputs are the output of AND gate 504 and the output 513 of comparator 511.

Output 508 of comparator 510 is connected to the reset input of latches 502 and 506 in order to reset the latches on the 8-bit boundaries so as to provide on output 368 of latch 506 a FLAG SENDING control signal which is active during the eight-bit flag periods.

Comparator output line 508 and FLAG SENDING control line 368 are provided to AND gate 518 which thus provides the reset signal on line 358. This signal is active at the end of the flag sending period so that counters 344 and 346 (Figure 5) are reset to zero in order to initiate the bit and subframe counting from that time.

The FLAG SENDING signal on line 368 is provided to frame counter 520 which is a one-bit counter providing an indication that the sent frame number is even or odd. This indication is required for sending normal flags or UCC flags, alternatively, as described in above referenced patent applications.

Latch 524 is set at the n subframe boundaries which are detected when comparator 349 (FIG. 5) detects an equality and provides an active signal on line 351 and is reset when the flag sending period begins, which is detected by comparator 500. Thus, the output of comparator 500 is provided to the reset input of latch 524, which is thus set during the r sending period and provides the r sending control signal on output 360.

AND gate 526 is connected to the output 513 of comparator 511, to FLAG SENDING line 368 through inverter 528 and to the output 360 of latch 524 through inverter 530. Thus AND gate 526 provides an active output signal on its output 370 at the 9-bit boundaries (in this embodiment of the invention, the circuit slots comprise 9 bits: 8 Cd bits + 1 Caq bit), when FLAG SENDING and r SENDING control signals are inactive. Thus, AND gate 526 provides on line 370 the NEXT slot control signal which is used for scanning slot table 326.

The flag patterns 01111110 and 01111111 are contained in shift registers 588 and 589 and the UCC flags are loaded in shift register 532 from bus 321. The two right-most bits of shift register 532 are set to 10 and the other bits indicate either the user change, if any, or are set to 011111 if no user change is requested.

The shifting of registers 588, 589 and 532 is performed under control of a logic circuit comprising AND gates 534, 536 and 538. These AND gates are conditioned by the FLAG SENDING signal on line 368 and by the medium bit clock signals from 348.

AND gate 534 provides an active shifting output signal when its third input 540 is activated by means of OR gate 542 and AND gate 546. AND gate 546 provides an active signal to one input of OR gate 542 when the OPERATION line 341 from finite state machine 332 is activated and when the output of frame counter 520 is at a first value corresponding to an odd frame number, for example. The second input of OR gate receives the SEND SYNCHRO PATTERN signal from output line 339 of finite state machine 332.

When these conditions are met, the normal 01111110 flag in register 528 is provided on line 362 to be sent by AND gate 378 (FIG. 5) on the medium link.

AND gate 538 provides an active shifting output signal during the flag sending period when AND gate 548 is activated i.e. when the OPERATION signal on line 341 from finite state machine 332 is active and when frame counter 520 indicates an even frame number. Thus, during this period the UCC flag is provided to AND gate 378 to be sent on the medium link.

In addition, circuit 356 comprises comparator 550 which compares the output signal provided by bit counter 512 with 1, so as to provide an active signal at each bit period on line 552.

This signal is provided to one input of AND gates 554 and 556. AND gate 554 receives on its second output the XMIT Caq INFO from line 164 of the link schedulers. Inverter 558 inverts the XMIT Caq INFO, and the inverted value is provided to the second input of AND gate 556.

The output signals of AND gates 554 and 556 are provided to the set inputs of latches 560 and 562. These latches are reset through the output signal from comparator 508.

Through this arrangement, if the XMIT Caq INFO is at 1 during the bit period following an 8-bit boundary, the Caq VALID C signal on output line 367 of latch 560 is at 1 and if the XMIT INFO is at 0, and the Caq VALID P signal on output line 369 of latch 562 is at 0.

Figure 8:
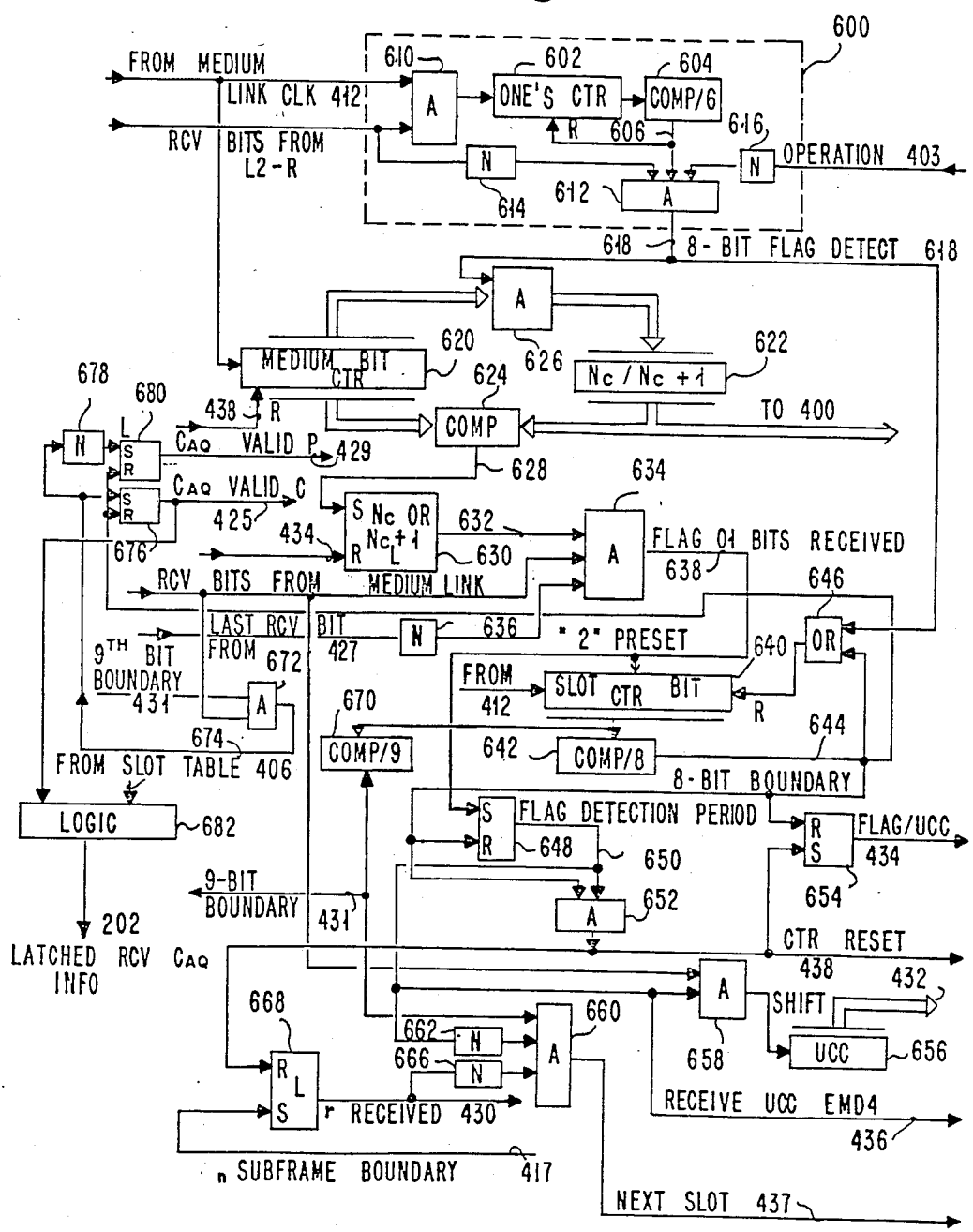
FIG. 8 represents circuit 428-1 of FIG. 6.

With reference to FIG. 8, part 428-1 of the circuit 428 shown in FIG. 6 will now be described.

This portion comprises circuit 600 which detects the flag configuration during the initialization period, i.e. when the OPERATION signal 403 from finite state machine 410 is not activated. Circuit 600 comprises one-counter 602 which counts the ones in the received bit stream. The received bit stream from the medium link is provided to AND gate 610 which also receives the medium link clock signal from 412. The output of AND gate 610 is provided to one-counter 602. Counter 602 content is compared with six in comparator 604 so that when six consecutive ones are found in the received bit stream, the output 606 of comparator 604 is activated and counter 602 is reset.

The output 606 of comparator 604 is provided to AND gate 612 which also receives the bit stream from the medium link, inverted in inverter 614, and the OPERATION signal from line 403 inverted in inverter 616. Thus AND gate 612 provides on its output line 618, an eight-bit flag detect signal which is activated during the initialization period when six consecutive ones followed by a zero are received.

The value Nc or Nc+1 of the complex frame bits is found during the initialization period by means of medium bit counter 620, Nc/Nc+1 register 622, comparator 624 and AND gate assembly 626. Counter 620 counts the medium link clock pulses from 412 and is reset by Ns and n counter reset signal from line 438. The content of counter 620 is gated by AND gate assembly 626 when the signal on line 618 is activated, into register 622. Consequently, register 622 contains the number of complex frame bits between two flags.

The medium access manager loads the parameters calculated from Nc/Nc+1 according to the method described in above referenced patent applications, and then becomes operational.

Then, the register 622 content is compared with the medium bit counter content in comparator 624, which provides an output signal on line 628 which is activated when medium bit counter 620 reaches the value recorded in register 622. This active signal sets latch 630 which controls the detection of the 01 first bits of the received flag.

The output line 632 of latch 630 is provided to AND gate 634 to which is also provided the received medium bits and the last received medium bit taken in register 427 (FIG. 6) and inverted in inverter 636. Consequently, AND gate 634 provides an output signal on line 638 indicating that the 01 delimiting configuration of the flag has been received. This signal is used to preset at 2 the slot bit counter 640. Slot bit counter counts the slot bits and its content is compared to 8 in comparator 642. Output line 644 of comparator 642 is activated when an equaqlity is detected which indicates a 8-bit medium link boundary. Counter 640 is reset by the output of OR gate 646 which receives the 8-bit flag detect signal on line 618 and the 8-bit medium link boundary signal on line 644.

Latch 648 is set by the 2-bit delimiting pattern of the flag received on line 638 and reset by the 8-bit medium link boundary signal on line 644 so that it remains set during the six bit period after the detection of the 01 delimiting pattern of the flag.

Output line 650 of latch 648 is provided to AND gate 652 which also receives output line 644 of comparator 642. Thus, the output signal of AND gate 652 is activated so as to provide the n and Ns counter reset signal on line 438 during the flag detection period.

Latch 654 is set by the signal on line 438 and is reset by the 8-bit medium link boundary signal on line 644 and provides to logic 418 in FIG. 6 the FLAG/UCC period signal on line 434 which is activated during the eight bit period following the last bit of the flag. This signal is needed to compensate the delay of the received bit stream introduced by shift register 427 in FIG. 6.

During the six bit period following the 01 delimiting configuration of the flag, the received medium bits are shifted in register 656 through AND gate 658, the inputs of which are connected to the medium link and to output line 650 of latch 648. Output bus 432 of UCC register 656 is provided to medium access manager 400 and used to update slot table 406.

Output 650 of latch 648 provides the receive UCC signal on line 436 which is provided of logic 418.

Comparator 670 is connected to the output of slot bit counter 640. It compares the content of this counter with 9, so as to provide on its output line 431, the 9-bit time signal. AND gate 660 receives the 9-bit time signal on line 431, the flag detection period signal on line 650 inverted by inverter 662 and the r received signal on line 430 inverted in inverter 666. It provides on its output line 437, the NEXT SLOT signal used for scanning slot table 406.

According to the present invention, circuit 428 comprises AND circuit 672 which receives on a first input, the 9-bit time signal from line 431 and on a second input the received bits so as to generate on its output line 674 a signal which is active when the bit received on the 9-bit time is equal to 1.

The output line of AND gate 672 is provided to the set input of latch 676 and to the input of inverter 678. The output of inverter 678 is provided to the set input of latch 680. Latches 676 and 680 are reset by the output signal from comparator 642 which is active at the 8-bit boundaries. Thus latch 676 provides the Caq VALID C signal on line 425 and latch 680 provides the Caq VALID P signal on line 429.

Caq VALID C signal is provided to logic 682, to generate at each slot of the subframe the latched RCV Caq INFO which is provided to the link schedulers on line 202.

Having thus described our invention with reference to a preferred embodiment thereof, it will be apparent to those of skill in the art that numerous departures or modifications in the specific logic circuits will be possible without departing from the basic method of operation of the invention. Therefore, the invention as described in the claims which follow is intended to be construed broadly.

We claim:

1. Pseudo synchronous transportation apparatus to be used in a communication network comprising a plurality of nodes for exchanging non-character coded information NCI and character coded information on internode links in frames comprising circuit slots devoted to the transporation of non-character coded information, which slots are assigned to circuit users on the call basis under control of node management means (13), said slots being qualified by at least one qualification bit (Caq) which indicates when set to a first value (0) that the users are momentarily active and when set to a second value (1) that the users are momentarily inactive, said mechanism being characterized in that it comprises, in the nodes which may be connected to local users:

storing means (11, 12) comprising queues of storing positions assigned on the call basis to the circuit users which send and receive information in the slots of the frames transported on the links connected to the node, the circuit user information received from the node links being stored into the assigned queue;

internode adapting means (14, 15) which controls the generation and the reception of the frames to and from each internode link operating under the control of the node management means and which assigns on the call basis a set of at least one slot in the frames transported on the network link to a plurality of circuit users and which comprises for each of said links, transmit and receive control means (24-T, 26-T, 20-R, 22-R, 28), said transmit control means comprising queue addressing means causing the queues of storing portions assigned to the said plurality of circuit users to be sequentially scanned and read and the read information corresponding to momentarily active users to be sent on the link during the assigned slots of successive frames together with a qualification bit set to a first value, said receive control means comprising queue addressing means causing the information received in the slots assigned to the said plurality of users in successive frames to be written into the queues of storing positions assigned to said users, which are sequentially scanned, when the qualification bits are found equal to the first value.

2. Apparatus according to claim 1, characterized in that the queue addressing means of the transmit control means comprises for each set of slots:

scanning control means 24-T, 108, 106, 104, 100) causing the queues assigned to the plurality of users sharing the set of slots to be sequentially scanned, the scanning sequence being established on the call basis by the node management means;

scanning modifying means (134, 236, 138 146, 188, 374) for detecting a change of the user activity and generating a change control information therefrom, for causing the slot assigned to the user for which a change is detected to be filled with change control information indicative of the queue which has to be deleted from or added to the scanning sequence.

3. Apparatus according to claim 1, characterized in that the queue addressing means of the transmit control means comprises for each set of slots:

scanning control means (24-T, 108, 106, 104, 100) causing the queues assigned to the plurality of users sharing the set of slots to be sequentially scanned, the scanning sequence being established on the call basis by the node management means;

Scanning modifying means (134, 136, 138 146, 188, 374) for detecting a change of the user activity, for causing the slot assigned to the user for which a change is detected to be filled with character coded information with a qualification bit set to the second value and the next assigned slots to be filled with change control information indicative of the queue which has to be deleted from or added to the scanning sequence.

4. Apparatus according to claim 2 or 3, characterized in that the receive control means comprise for each set of slot(s) shared by a plurality of users:

scanning control means (20-R, 206, 204,240, 234) causing the queues assigned to the plurality of users sharing the set of slot(s) to be sequentially scanned, the scanning sequence being established on the call basis by the node management means, scanning modifying means (262, 264, 266, 268, 270, 274, 276) which are responsive to the received change control information to cause queues to be deleted from or added to the scanning sequence, write inhibiting means (250) which prevent the bits received in slot(s) transporting the change control information to be written into the storing means.

5. Apparatus according to claim 3, characterized in that the slots filled with change control information are qualified with qualification bits set to the first value.

6. Apparatus according to claim 5 characterized in that the scanning modifying means in the receive control means comprises means (264, 276, 266) which are responsive to a change from the second value to the first value of the qualification bits of two successive slots assigned to a plurality of users and to the information received in the second of said successive slot to cause the scanning sequence of the queues to be changed.

7. Apparatus according to claim 1 characterized in that the transmit control means comprises for each set of slots:

transmit marking means (24-T) comprising a number of positions equal to the maximum number of users which may share the set of slots, which are loaded by the node management means on the call basis, to contain the addresses of the queues assigned to the plurality of users which may share the set of slots together with presence information (presence bit) indicative when set to a first value (1) that the queue address is to be read and when set to a second value (0) that the queue address is not to be read;

marking table addressing means (108, 106, 184) which causes the marking table to be sequentially addressed during the time durations of the slots of the frames assigned to the plurality of users and read, and which are responsive to the read presence information to cause the next position of the marking table to be accessed when the presence information is found equal to the second value or the read address to be used for addressing one queue and the content of the addressed queue to be sent on the link, when the presence bit is found equal to the first value;

status indicating means (82) for generating status signals indicating whether the queues are empty or not, scanning modifying means (146, 112, 188, 374) which are responsive to the presence information and to the status signals to generate a change control signal when the presence information is found equal to the second value and the status signal indicates that the addressed queue is not empty and when the presence information is found equal to the first value and the status signal indicates that the addressed queue is empty, to cause character coded information to be sent instead of the user information read from the queue and the next slot assigned to the plurality of users to be filled with a change control information indicative of the user queue which has to be added in the scanning process in the first case and of the user queue which has to be deleted from the scanning process in the second case, and the presence information to be modified accordingly.

8. Apparatus according to claim 7 characterized in that the receive control means comprise for each set of slots shared by a plurality of users:

receive marking means (20-R), comprising a number of positions equal to the maximum number of users which may share the set of slots and which are loaded by the node management means on the call basis so as to contain the addresses of the second queues assigned to the plurality of users which may share the set of slots and in correspondence to each stored address, a presence information indicating when set to a first value (1) that the quque is to be scanned and written and when set to a second value (0) that the queue is not to be scanned;

marking table addressing control means (204, 206) which cause the marking table to be sequentially addressed during the time durations of the slots assigned to the plurality of users and whicha re responsive to the presence information read from the addressed position to cause the next position to be read when the presence information is found equal to the second value or the address read from the marking table to be used for addresing the corresponding queue, when the presence bit is found equal to the first value;

gating means (250) which are responsive to the received qualification bits to cause the bits which are received from the links to be written into the addressed queue when said bits are found equal to the first value; and scanning modifying means (262,264, 268, 266, 274, 276) which are responsive to the qualifying bits received in successive assigned slots to detect that said bits change from the second value to the first value to cause the presence information of the receive marking table to be modified according to the received change control information and the writing of the change control information into the storing means to be inhibited.

* * * * *